A. GAILLARD.
DEVICE FOR CONTROLLING THE SPEED OF AUTOMOBILE VEHICLES.
APPLICATION FILED MAY 20, 1920.

1,400,810.  Patented Dec. 20, 1921.

INVENTOR:
Antoine Gaillard
By Wm Wallace White
ATTY.

UNITED STATES PATENT OFFICE.

ANTOINE GAILLARD, OF MARSEILLE, FRANCE.

DEVICE FOR CONTROLLING THE SPEED OF AUTOMOBILE VEHICLES.

1,400,810.

Specification of Letters Patent.  Patented Dec. 20, 1921.

Application filed May 20, 1920. Serial No. 382,751.

*To all whom it may concern:*

Be it known that I, ANTOINE GAILLARD, citizen of the Republic of France, residing at Marseille, in the Republic of France, have invented new and useful Improvements in or Modifications of the Device for Controlling the Speed of Automobile Vehicles, according to my Patent No. 1,331,751, of which the following is a specification.

This invention relates to improvements in or modifications of the device for controlling the speed of automobile vehicles according to my Patent No. 1,331,751, dated February 2, 1920, in which a passenger in an automobile is able to admit fresh air to the inlet pipe conveying the carbureted gas to the engine to reduce its richness and to diminish the speed of the motor, with the object of enabling the passenger not only to himself reduce at any moment and while the car is running, the speed of his automobile independently of the will and action of the driver, but also to considerably reduce the consumption of fuel, means being provided to enable the driver temporarily to regain full control of his vehicle whenever by reason of unforeseen circumstances, temporary or special, it is necessary that the motor shall develop full power and speed, for example in order to rapidly pass another vehicle, or an obstacle or climb a slope.

The invention will be described with reference to the accompanying drawings, in which.

In the construction shown in the annexed drawings a cylinder D is fixed by soldering or any other means on the inlet pipe or manifold A connecting the carbureter with the motor. At the top of this cylinder a plug or stopper E perforated with circumferential holes is screwed and forming a tubular sleeve at its center.

Within the cylinder D, and slidable with slight friction therein, is a second cylinder H, which is open at its upper end to the perforations in the plug E and closed at its lower end. The cylinder H is provided with a plurality of perforations N in its side wall, and for purposes of illustration these perforations are shown herein extending longitudinally of the cylinder. A helical spring I is placed within the cylinder H, one end of said spring abutting against the inner end of the plug E and its opposite end against the inner end wall of the cylinder H, thus exerting its pressure to cause the cylinder H to slide out of the cylinder D.

Figure 1:
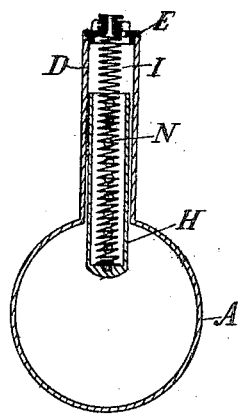
Figure 1 is an end sectional elevation of a modified device.
Figure 2:
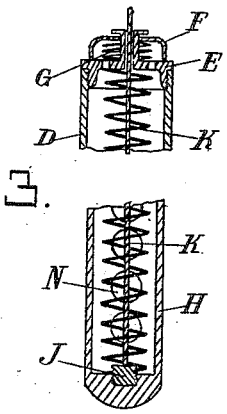
Figs. 2 and 3 are views on an enlarged scale of the ends of the valve of Fig. 1.
Figure 3:
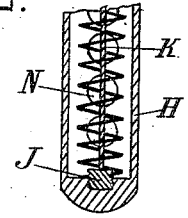

A cup-shaped member F is mounted on the sleeve of the stopper E so as to have a slight vertical movement thereon, this member having a flange which incloses all of the perforations in the stopper and thus acts as a valve for controlling the supply of air through said perforations. Under normal working conditions, the vacuum existing in the manifold A causes the flange of the valve F to be seated on the stopper E as shown in Fig. 2, because of the atmospheric pressure on the top surface of said valve, thus shutting off the supply of air through the openings in the stopper. A spring G, however, is provided which encircles the sleeve of the stopper and exerts its tension on the valve in opposition to the atmospheric pressure, this spring being of just sufficient strength so that when the pressure in the manifold reaches atmospheric pressure, or nearly so, the spring tension in addition to such pressure within the valve raises said valve sufficiently to permit air to flow into the cylinder H through the perforations in the stopper E.

In the bottom of this cylinder, which forms the air regulating distributer, a piece J is screwed which receives the flexible cable K in a flexible pipe emerging from the cylinder D through the tubular sheath before mentioned and being wound up on a small winch L (Fig. 4) placed in the vehicle within reach of the passenger's hand.

The characteristic feature of the connection of the cable K and the fresh air regulating distributer is that in case of the accidental rupture of the cable no piece can be carried into the inlet A to obstruct it.

An adjustment turnbuckle M placed on the cable enables its length to be regulated and to be placed in a good condition for working.

The working is as follows:

The passenger regulates by means of the winch L the position of the regulating cylinder H for distributing the fresh air, which, cylinder, as stated, slides in the cylinder D, forming a closing sleeve by compressing or allowing to expand the spring I according to the direction of rotation of the winch.

According to the number of holes N uncovered, a larger or smaller quantity of fresh air is introduced into the admission pipe A and with it consequently the richness of the carbureted gas and the speed of the motor become variable.

Figure 4:
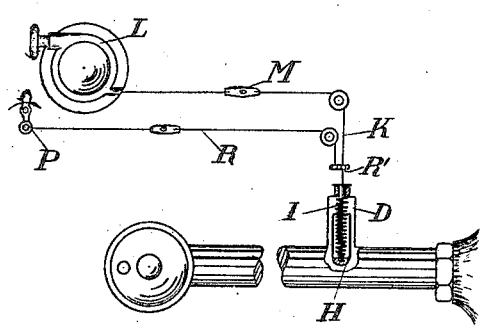
Fig. 4 is a diagrammatic view of the installation of this arrangement with a control lever placed at the disposal of the driver to permit him to temporarily neutralize the controlling action of the passenger.

In other words, the spring G is of sufficient strength to retain the valve F open when the pressure within the intake manifold is equal or nearly equal to atmospheric pressure. When, however, the pressure within the manifold is substantially less than atmospheric pressure, the tension of the spring is overcome by the atmospheric pressure at the exterior of the valve F and therefore the valve is closed. This change in pressure in the manifold is due to operation of the usual "butterfly" valve between the carbureter and the motor. As is well-known, when the butterfly valve is only slightly open and the engine consequently running at low speed, the pressure within the manifold is reduced, because of the small openng from the carbureter. Upon further opening of the butterfly valve by the driver of the car, the pressure is increased, and therefore the engine runs at high speed. Consequently, with the apparatus of this invention attached to the manifold as shown in Fig. 4, as soon as the pressure within the manifold approaches atmospheric pressure it assists the spring G in overcoming the atmospheric pressure at the exerior of valve F, and thus opens this valve so that air is freely admitted to the cylinder H. And it follows that in proportion to the length of the cylinder H, that is projected into the manifold under the action of spring I, a larger or smaller number of the openings N in said cylinder will be uncovered in the manifold, thereby to admit a sufficiently large quantity of air to the manifold for "thinning" the combustible mixture and reducing the speed of the engine. It will, therefore, be readily seen that, as the passenger may, by the use of the so-called winch L, control the distance which the cylinder H is projected into the manifold, he also controls the richness of the fuel mixture that is delivered to the cylinder of the engine.

When the regulating air distributer H is completely located in the fixed cylinder the fresh air which has penetrated through the valve remains in this distributer H because as this latter, as has been already stated, slides with slight friction in the other, the air cannot pass through the holes closed by the walls of the cylinder D.

In addition to regulating the speed of the vehicle the arrangement described as well as its modification of construction enables the consumption of petrol to be considerably reduced.

The chauffeur's control arrangement Fig. 4 allows him to temporarily assume command of his vehicle. It operates only when the chauffeur exerts by hand or foot a pressure upon it, the passenger's control coming into full effect when the pressure exerted by the chauffeur ceases.

It consists of a flexible cable R sliding in a flexible pipe (not shown) and is connected on the one hand by means of a clip R' with the cable K of the little winch L and on the other hand with a lever P fixed on the steering wheel or at other suitable point within reach of the chauffeur.

By exerting a slight pressure on the lever P in the direction of the arrow shown in Fig. 4 the cable R draws on the cable K of the passenger's control and raises the perforated cylinder H in the sheath D against the action of the spring I, thus covering more or less of the openings and proportionately neutralizing the effect of the perforated cylinder H.

When the pressure ceases on the lever P the cable K, stretched by the spring I, returns to its initial position and consequently also its regulating air distributer H.

Seeing that the chauffeur cannot exert a constant pressure on the control lever P and that he will only exert this pressure under special circumstances, it follows that when these special circumstances are not present the control of the passenger is always effective.

Having now particularly described and ascertained the nature of my said invention and in what manner the same is to be performed, I declare that what I claim is:

1. A device of the class described, comprising in combination, a casing in communication at one end thereof with the intake manifold of an engine, an automatically movable valve at the opposite end of said casing for controlling the admission of air thereto, a tubular member telescoping within said casing and provided with a plurality of perforations, means for projecting said tubular member thereby to bring its perforations into communication with said manifold, and means for controlling the operation of said last means.

2. A device of the class described, comprising in combination, a casing in communication at one end thereof with the intake manifold of an engine, an automatically movable valve at the opposite end of said casing for controlling the admission of air thereto, a tubular member telescoping within said casing and provided with a plurality of perforations, means for projecting said tubular member thereby to bring its perforations into communication with said manifold, means for controlling the operation of said last means, and independent means for rendering said last means inoperative.

3. A device of the class described, comprising in combination, a casing in communication at one end thereof with the intake manifold of an engine, a movable valve for closing the opposite end of said casing, a spring for maintaining said valve in open position when the pressure within the casing is substantially equal to atmospheric pressure, a tubular member telescoping within said casing and provided with a plurality of perforations, means for normally retaining said member in projected position thereby to bring its perforations into communication with the manifold, and means for controlling the operation of said last means.

4. A device of the class described, comprising in combination, a casing in communication at one end thereof with the intake manifold of an engine, a valve for closing the opposite end of said casing, a spring for maintaining said valve in open position when the pressure within the casing is substantially equal to atmospheric pressure, a tubular member telescoping within said casing and provided with a plurality of perforations, means for normally retaining said member in projected position thereby to bring its perforations into communication with the manifold, and a manually operable cable secured to said tubular member to telescope the same against the action of said last means.

5. A device of the class described, comprising in combination, a casing in communication at one end thereof with the intake manifold of an engine, a valve for closing the opposite end of said casing, a spring for maintaining said valve in open position when the pressure within the casing is substantially equal to atmospheric pressure, a tubular member telescoping within said casing and provided with a plurality of perforations, means for normally retaining said member in projected position thereby to bring its perforations into communcation with the manifold, a manually operable cable secured to said tubular member to telescope the same against the action of said last means, and an independently operated cable for telescoping the tubular member.

6. A device of the class described, comprising in combination, a casing in communication at one end thereof with the intake manifold of an engine, a valve for closing the opposite end of said casing, a spring for maintaining said valve in open position when the pressure within the casing is substantially equal to atmospheric pressure, a tubular member telescoping within said casing and provided with a plurality of perforations, a spring for normally projecting said member from said casing thereby to bring its perforations into communication with the manifold, and manually operable means for telescoping said member against the action of said spring.

In testimony whereof I have signed my name to this specification.

ANTOINE GAILLARD.

Witnesses:
 EUGENE DUEASSON,
 GABRIEL ANDRÉ.